３,306,752
PROCESS FOR PRODUCING FRUCTOSE
BY FERMENTATION
Kiyomoto Ueda, 3—1411 Ikebukuro, Tokyo, Japan
No Drawing. Filed May 15, 1964, Ser. No. 367,865
Claims priority, application Japan, May 20, 1963,
38/25,309; Nov. 2, 1963, 38/58,574
17 Claims. (Cl. 99—142)

This invention relates to a process for producing fructose by fermentation. More particularly, the invention pertains to a process for preparing fructose by fermentation, characterized by inoculating and culturing a fructose-producing microorganism in a medium containing sorbitol as a carbon source and incorporated with a suitable nitrogen source, inorganic salts and, if necessary a fermentation promotor, thereby producing and accumulating fructose in the culture medium and then isolating and recovering fructose from the medium.

As the methods of producing fructose by using microorganisms, there have conventionally known those carried out by culturing acetic acid-bacteria, such as *Acetobacter suboxydans*, in a medium composed mainly of mannitol, thereby producing and accumulating fructose in the medium [G. Bartrand: "Anal. de Chimie et Physique," 3 (VIII), 181 (1904); Takahashi and Asai: "Nogei Kagaku Kaishi" (Journal of the Agricultural Chemical Society of Japan), 9, 396 (1935)]; by adding to a starting material of mannose or glucose the cells of a specified microorganism belonging to the genus Pseudomonas or Aerobacter, or an enzyme preparation of cells of said microorganism, thereby effecting the isomerization (stereoisomerization) of the material to produce fructose [N. G. Valeroni et al.: "Journal of Biological Chemistry," 218, 535 (1956); O. M. Marshal et al.: "Science" 125, 648 (1957); Tsumura and Sato: "Agricultural and Biological Chemistry," 25, 616 (1961)] or by adding to a starting material of sorbitol an enzyme preparation extracted from a specified acetic acid bacterium and an assistant material promoting the reaction by said enzyme, thereby producing fructose [J. T. Cummins et al.: "Journal of Biological Chemistry," 224, 323 (1957)].

Among these, the process carried out by using mannitol is markedly expensive in the cost of starting material, and the method conducted by using cultured cells of a specified microorganism or an enzyme preparation extracted therefrom requires 2 or 3 stages of production steps and suffers from the drawback that the yield of fructose is relatively low, in general.

Further, among the above conventional methods, the process effected by use of glucose or mannose as a starting material is bound up with the drawback that the inversion reaction does not proceed completely and the fructose produced is difficultly separable from the residual glucose. However, in case a sugar-alcohol, such as mannitol or sorbitol, is employed as a starting material, the resulting fructose is easily separated. In this connection, therefore, the latter is more advantageous than the former.

According to the conventional process using sorbitol as a starting material, fructose is produced by adding to and mixing with the starting material sorbitol, an enzyme extracted from the cells of a specified microorganism, a diphosphopyridine nucleotide (DPN) and such substance as pyruvic acid. In contrast to this, the process of the present invention is carried out by inoculating and culturing a specified microorganism directly in a medium comprising sorbitol as a carbon source and incorporated with suitable substarting materials, thereby producing fructose in the culture medium and then separating and recovering the fructose thus produced. The process of the present invention, therefore, gives such marked industrial effects that fructose is produced by only one step, the recovery of fructose from the culture medium is relatively easy, and the yield of fructose is higher than that attained by any of the conventional processes.

The present invention is illustrated in further detail hereinbelow: As a fermentation process using sorbitol as a carbon source, there has conventionally been sorbose fermentation in which acetobacter or gluconobacter is employed. As is well known, said sorbose is a starting material for the synthesis of vitamin C.

The present inventor, however, separated and detected from various samples such microorganisms as are capable of producing and accumulating fructose in a culture medium adopted in fermentation process, in which sorbitol was used as a carbon source, to find that numerous strains of the following numbers have such oxidizing ability. As a result of detailed examination of their microbiological properties, the above strains were identified as *Bacillus megaterium*, *Pseudomonas fluorescens*, and *Pseudomonas boreopolis*, respectively.

(1) *Bacillus megaterium*:

| No. 3–8C | No. 11–3C–3 |
| No. 4–3C | No. 18–5A–2 |
| No. 6–1A–1 | No. 37–3B (ATCC 15450) |
| No. 7–1A–3 | |

(2) *Pseudomonas fluorescens*:
No. 52–1C (ATCC 15453)

(3) *Pseudomonas boreopolis*:
No. 299–1B–3 (ATCC 15452)
No. 242–9B–5
No. 238–2B–2

As a result of further researches on said fermentation, the present inventor has discovered a strong fructose-producing microorganism, which is somewhat similar to the aforesaid *Bacillus megaterium* but is obviously different in detailed microbiological properties. That is, the microorganism is similar to *Bacillus megaterium* in microscopic observation and physiological properties, but is greatly different therefrom in cultural observation and does not form spores in an ordinary medium. When a cultured liquid of the microorganism was added to sterilized quartz sand (sterilized two times under pressure at 120° C. for 3 hours), dried under reduced pressure and sealed, as means for preserving the strain, and allowed to stand at —40° C. for one month, the microorganism formed, on bouillon agar, colonies producing spores. On bouillon agar, the microorganism perishes in a short period at room temperature, but no such change as lowering the fructose-producing ability is seen, unlike the case of *Bacillus megaterium*.

Detailed microbiological properties of said microorganism are as follows:

MICROSCOPIC OBSERVATION

Rods, 1.0 to 1.5 by 4.0 to 5.0 microns, with rounded ends, occurring singly, in pairs or in short chains. Granules observed in microbial cell. Motile Gram-negative. No acid-fast. Spores formed depending on conditions, but difficultly formed ordinarily, 0.9 to 1.2 by 1.0 to 2.0 microns, positioned at the center or on ends, spore-wall is thin. Sporangia not swollen.

CULTURAL OBSERVATION

Gelatin stab culture: Slow liquefaction.
Bouillon peptone agar colonies: Large circular, entire, smooth, soft, elevated, non-spreading, dense, yellowish brown.
Bouillon peptone agar slants: Good growth, filiform, smooth, soft, opaque, glistening, non-adherent, yellowish brown.

Glucose bouillon agar slants: Growth more abundant, soft, glistening, creamy white to yellow.

Bouillon peptone broth: Slightly turbid, no film formed, precipitated.

Potato: Good growth, soft, viscous, glistening.

Potato agar slants: Good growth, glistening, viscous, golden yellow.

PHYSIOLOGICAL PROPERTIES

Nitrates not reduced. Acid but no gas from arabinose, xylose, glucose, fructose, galactose, lactose, sucrose, maltose, raffinose, inulin, starch, dextrin, glycerol, mannitol, and sorbitol (with ammonium salts as source of nitrogen). Acetylmethylcarbinol not produced. Methyl red reaction positive. Indole not produced. Hydrogen sulfide slightly produced. Litmus milk peptonized. Catalase positive. Large amount of fructose produced and accumulated from sorbitol under aerobic conditions. Acid produced under microaerobic conditions. Optimum temperature 27°–37° C., no growth at 40° C. Optimum pH range 6.5–7.2, growth range 5.5–7.6.

The microbiological properties of the present microorganism as mentioned above were compared with those of similar microorganisms shown in Bergey's Manual of Determinative Bacteriology to find that the former differed from anyone of the latter. The present inventor therefore recognized that the microorganism is a new species and has denominated it as *Bacillus fructosus* nov. sp. (ATCC 15451).

The present invention aims to produce fructose by inoculating and culturing the above microorganism in a sorbitol medium and separating and recovering the resulting fructose, as well as to prepare a fructose containing sweetening by concentrating the cultured medium.

In accordance with the process of the present invention, the medium to be used for the fermentation is prepared by adding to a 5–10% aqueous sorbitol solution, 0.05–0.5% of a suitable organic or inorganic source, such as yeast extract, meat extract, casein hydrolysate, corn steep liquor, nitrate, ammonium salt or urea, and suitable amounts of inorganic salts, such as 0.05–0.2% of potassium phosphate, 0.05–0.2% of magnesium sulfate and a slight amount of other heavy metal salt, and the medium thus prepared is adjusted to pH 6–8. After the medium is sterilized and then incorporated with 1% of separately sterilized calcium carbonate, the microorganism is inoculated and cultured in the medium.

A suitable temperature for the culture is 25°–35° C., and a period for submerged culture is 2–4 days while for surface culture 5–10 days.

The amount of fructose produced in the cultured medium is estimated according to Bertrand's sugar estimation method or to Somogyi's modification method. The fermentation yield, i.e. the estimated value of fructose, reaches 80–85% based on the amount of sorbitol employed.

Fructose produced is recovered from the cultured medium in the following manner: The cultured medium is filtered to remove residual calcium carbonate and cells and the filtrate, after being adjusted to neutral pH, is concentrated under reduced pressure to a ⅕ volume. To the filtrate thus treated, alcohol is added, if necessary, to precipitate residual sorbitol, which is then filtered off, and thereafter the alcohol is removed by distillation. To the thus obtained concentrate, lime milk is added at a low temperature to produce calcium fructate, which is then recovered by filtration. The calcium fructate is suspended in water while introducing carbon dioxide to liberate fructose and calcium carbonate formed is removed by filtration. The aqueous fructose solution thus obtained is purified according to active carbon or ion exchange resin treatment and is then concentrated under reduced pressure to obtain a fructose crystal.

The crystal was Selivanov reaction positive, and was subjected to paper chromatography by use of anisidine hydrochloride to form a spot exhibiting a yellow color, which is peculiar to ketohexose (the color is brown, in the case of aldose) and the $R_f$ thereof completely coincided with that of fructose. Further, when heated together with phenylhydrazine over a boiling water bath, the crystal forms an osazone in such a short time as about 6 minutes (sorbose forms no osazone even when heated for 15 minutes). The osazone has a melting point of 204°–205° C. and is identical with that from fructose. Even if the osazone is mixed with that from fructose, the resulting mixture is not lowered in melting point. In addition, an aqueous solution of the crystal is quickly fermented with yeast (sorbose is not fermented) and, when mixed with lime, the crystal forms a complex salt. In view of the above facts, it is confirmed that the crystal is fructose.

The above illustration is directed to portions relating to a method for producing fructose in which the desired product is separated and recovered from a fermented liquid. However, the present invention further involves a process for preparing a fructose-containing seasoning comprising inoculating and culturing the microorganism in a medium, discontinuing the culture when 24–72 hours have elapsed after the inoculation, i.e. when the fermentation yield: amount of fructose produced/sorbitol, has become about 20–50%, filtering the intermediary cultured liquid and purifying the filtrate according to active carbon or ion-exchange resin treatment, followed by concentration. In this case, the medium should comprise inorganic salts except sorbitol.

The sweetening liquid obtained according to the above process still contains a large amount of sorbitol and hence is markedly excellent as a moistened sweetening agent. Conventionally, moistened sweetening agents of this kind have been prepared by purposely incorporating glucose or sucrose into sorbitol. However, in case fructose is incorporated in accordance with the present invention, the resulting mixture is strong in sweetness to form a moistened sweetening agent having an elegant taste.

The present inventor has further effected a detailed examination of the medium conditions of said fermentation to find that, in a sorbitol medium containing specific amino acids as source of nitrogen and specific heavy metal, the fermentation is promoted and fructose is produced in a short period with a high yield.

The process of the present invention and the progress of experiments, on which the present invention is established, are illustrated in detail hereinbelow:

In fructose fermentation, a medium containing inorganic nitrogen as a nitrogen source gives a poor yield, in general, whereas one containing corn steep liquor (hereinafter referred to as C.S.L.) among organic nitrogen sources is markedly high in fermentation yield and velocity. The present inventor assumed that this would be ascribable to specific inorganic salts contained in C.S.L. Based on the above assumption, the inventor effected fermentation tests using sorbitol media containing, in addition to various nitrogen sources, a hydrochloric acid solution of C.S.L. ash obtained by evaporating C.S.L. to dryness, roasting the resultant at about 600° C. to obtain ash and dissolving the ash in a small amount of hydrochloric acid. The basic composition of the sorbitol media employed in the tests was 5% sorbitol, 0.1% $KH_2PO_4$ and 0.05% $MgSO_4 \cdot 7H_2O$, and the medium was adjusted to pH 7.2. The amounts of various nitrogen sources to be added had been previously confirmed so that a same cell propagation level was attained, and the amount of roast C.S.L. ash added corresponded to 0.3% of C.S.L. The cultivation was effected according to shaking culture and the microorganism employed was *Bacillus fructosus* nov. sp. (ATCC 15451). The estimation of the resulting fructose was conducted according to Somogyi's modification method. The results obtained were as shown in Table 1.

TABLE 1.—FRUCTOSE YIELD (BASED ON SORBITOL)

| Nitrogen source | Culture time | | |
|---|---|---|---|
| | 24 hrs., percent | 48 hrs., percent | 72 hrs., percent |
| 0.1% Ammonium acetate | 7.7 | 10.3 | 12.8 |
| 0.1% Ammonium acetate plus ash | 11.5 | 24.4 | 31.6 |
| 0.2% Yeast extract | 12.6 | 13.4 | 15.0 |
| 0.2% Yeast extract plus ash | 32.5 | 75.6 | 74.8 |
| 0.3% Casate | 14.0 | 18.0 | 22.0 |
| 0.3% Casate plus ash | 40.8 | 80.1 | 65.3 |
| 0.3% Meat extract | 13.0 | 14.0 | 16.0 |
| 0.3% Meat extract plus ash | 26.8 | 51.3 | 58.1 |
| 0.15% Peptone | 12.6 | 13.4 | 14.8 |
| 0.15% Peptone plus ash | 12.1 | 23.8 | 30.6 |
| 0.3% C.S.L. | 20.0 | 51.0 | 72.0 |

From the results of above test, it was recognized that although the roast C.S.L. ash obviously showed an excellent fermentation-promoting effect, the addition of said ash alone is not a sufficient condition necessary for the fermentation, in view, for example, of the value attained by use of inorganic nitrogen source. Further, when casate (an enzymatic hydrolysate of caseine, produced by Toyo Vitamin Co., Ltd.) was employed in combination with the ash, the yield is higher than in the case of C.S.L. alone. In this connection, it was considered that, in fructose fermentation, amino acids would also give fermentation-promoting effects, in addition to specific inorganic salts.

Subsequently, the inventor treated the aforesaid hydrochloric acid solution of roast C.S.L. ash with an ion-exchange resin to divide the solution into cation and anion fractions and subjected to the two fractions to the same fermentation test as above to find that the fermentation-promoting effect is attained only by the cation fraction and not by the anion fraction at all. Based on the above finding, the inventor effected fermentation tests, uisng media comprising as nitrogen source the casate, which showed the most favorable result in the tests set forth in Table 1, and adding to the media slight amounts of various metal salts. As the result, the inventor has discovered that media incorporated with a salt of a heavy metal such as manganese, cobalt, copper or zinc give substantially the same effect as that of a medium containing roast C.S.L. ash. Relationship between the addition amounts of the salts of heavy metals and the yield of fructose is shown in Table 2, with reference to manganese among the above metals. The values shown in Table 2 were attained by cultivation effected for 48 hours, respectively.

TABLE 2

| Manganese content in medium, p.p.m. | Fructose yield (based on sorbitol) | |
|---|---|---|
| | Bacillus fructosus (ATCC 15451), percent | Bacillus megaterium (ATCC 15450), percent |
| 0 | 20.3 | 10.5 |
| 0.3 | 72.1 | 64.0 |
| 0.5 | 80.5 | 71.6 |
| 1.0 | 81.1 | 72.2 |
| 10.0 | 81.1 | 78.3 |
| 30.0 | 82.0 | 72.5 |
| 50.0 | 81.8 | 65.6 |
| 100.0 | 80.5 | 56.6 |
| 150.0 | 52.2 | 23.5 |
| 200.0 | 27.8 | 9.1 |

From the results set forth in Table 2, it is understood that, in fructose fermentation, the optimum concentration range of manganese is about 0.3–100 p.p.m. Other metals, however, showed such a relatively narrow optimum concentration range as 0.5–1 p.p.m., respectively.

Since fermentation-promoting metals were thus confirmed, the inventor effected fermentation tests, in order to examine the synergistic effects on fermentation promotion of amino acids and metal salts, using sorbitol media comprising various nitrogen sources to which $MnSO_4 \cdot 4H_2O$ had been added as manganese so that the concentraton became 1 p.p.m. The tests were carried out in substantially the same manner as in the case of Table 1. Tests results are shown in Table 3.

TABLE 3.—FRUCTOSE YIELD (BASED ON SORBITAL)

| Nitrogen source | Culture time | | |
|---|---|---|---|
| | 24 hrs., percent | 48 hrs., percent | 72 hrs., percent |
| 0.1% Ammonium acetate | 3 | 12 | 17 |
| 0.1% Ammonium acetate plus Mn | 7 | 30 | 56 |
| 0.2% Casate | 4 | 15 | 28 |
| 0.2% Casate plus Mn | 43 | 81 | |
| 0.4% Glutamic acid | 2 | 14 | 20 |
| 0.4% Glutamic acid plus Mn | 25 | 51 | 80 |
| 0.2% Aspartic acid | 6 | 10 | 19 |
| 0.2% Aspartic acid plus Mn | 24 | 48 | 79 |
| 0.1% Aspartic acid | 4 | 16 | 23 |
| 0.12% Glutamic acid | | | |
| 0.12% Glutamic acid plus Mn | 30 | 50 | 77 |
| 0.4% Arginine hydrochloride | 4 | 19 | 26 |
| 0.1% Proline | | | |
| 0.1% Proline plus Mn | 32 | 56 | 80 |
| 0.02% Arginine hydrochloride | | | |
| 0.08% Proline | 3 | 16 | 23 |
| 0.05% Aspartic acid | | | |
| 0.06% Glutamic acid | | | |
| 0.06% Glutamic acid plus Mn | 45 | 80 | |
| 0.3% C.S.L. | 25 | 51 | 76 |

As the result of the tests, it was observed that effective amino acids were arginine, proline, aspartic acid, glutamic acid, alanine, leucine and valine. Above all, L-glutamic acid, L-aspartic acid, L-arginine and L-proline were recognized to be particularly marked in fermentation-promoting effect. When said 4 amino acids were used independently, the fermentatioin velocity attained was somewhat slower than in the case of casate, but when 2 or more of the amino acids were used in combination, the fermentation velocity became substantially the same as in the case of casate.

As illustrated above, the present invention aims to produce fructose by inoculating and culturing a fructose-producing microorganism belonging to the genus Bacillus, such as *Bacillus megaterium* or *Bacillus fructosus* nov. sp., in a medium prepared by adding to a sorbitol medium as nitrogen source one or more members selected from the group consisting of L-glutamic acid, L-aspartic acid, L-arginine and L-proline and substances containing said amino acids, such as decomposition products of protein, extracts of plants, and extracts of microbial cells, and further adding thereto small amounts of one or more inorganic substances, particularly those selected from the group consisting of manganese, cobalt, copper and zinc, thereby producing and accumulating fructose in the medium and then recovering the fructose from the medium.

The amount of amino acid to be added to the medium employed in the present invention is within the range of the amount of nitrogen source added to an ordinary fermentation medium. In case the amount of amino acid is in excess, the fermentation yield is lowered due to excessive propagation of cells. Further, the amount of amino acid is suitably controlled by the concentration of sorbitol, a carbon source, and a suitable amount of amino acid is about 0.6% in the case of a medium having a sorbitol concentration of 15% which contains casate as nitrogen source, and is about 2–3% in the case of such medium having a sorbitol concentration of below 15%.

The following examples illustrate the present invention:

Example 1

Each 50 cc. of a medium at pH 7.2 comprising 5% sorbitol, 0.1% casein hydrolysate, 0.1% ammonium chloride, 0.1% potassium phosphate and 0.05% magnesium sulfate was charged in 500 cc. shake-flasks and was sterilized, respectively. To each medium, 1% of separately sterilized calcium carbonate was added. Into the medium, a strain of *Bacillus megaterium* No. 37–3B (ATCC 15450) was inoculated and was subjected to shaking culture at 30° C. After 3 days of cultivation, the production of fructose reached a maximum of 51% based on the sorbitol.

The cultured medium which had finished the culture was filtered to remove the calcium carbonate and cells and adjusted to pH 7.0 One liter of the medium was concentrated under reduced pressure to a volume of 200 cc. The concentrated broth was cooled to below 5° C. To the cooled concentrate, was added while stirring 50 cc. of 20% calcium oxide milk cooled as well to below 5° C., whereby a white slurry-like calcium fructate was formed. The calcium fructate was suction-filtered and the resulting cake was washed with water cooled to less than 5° C. Subsequently, the calcium fructate was suspended in 200 cc. of cold water and carbon dioxide was introduced into the suspension to adjust the pH to about 7.0, whereby calcium carbonate was precipitated. The precipitate was removed by filtration to obtain a free fructose solution.

The solution was adjusted to pH 4.5 with hydrochloric acid and was subjected to decolorization treatment by addition of active carbon and then to ion exchange resin treatment to remove inorganic substances. The resulting colorless transparent liquid had a fructose content of 5.2% and a volume of about 400 cc. The liquid was concentrated under reduced pressure and about 10 g. of fructose crystal was obtained.

*Example 2*

Into a medium having the same composition and volume as in Example 1, a strain of *Pseudomonas boreopolis* No. 299–1B–3 (ATCC 15452) was inoculated and subjected to shaking culture at 30° C. for 3 days, whereby a maximum of about 36% based on sorbitol of fructose was produced.

About 1.5 liters of the cultured medium which had finished the culture was collected, filtered, neutralized and concentrated under reduced pressure to a volume of about 100 cc. To the concentrated broth, an excess alcohol was added to precipitate residual sorbitol, which was then removed by filtration. The filtrate was subjected to distillation to remove the alcohol. The residual liquid was cooled to below 5° C. and was purified in the same manner as in Example 1, through the formation of calcium fructate, liberation of fructose, active carbon treatment and ion-exchange resin treatment, whereby about 400 cc. of a 5.5% fructose solution was formed. From the solution thus formed, about 11 g. of fructose crystal was obtained.

*Example 3*

Each 50 cc. of a medium at pH 7.0 comprising 5% sorbitol, 0.4% C.S.L., 0.1% potassium phosphate, and 0.05% magnesium sulfate was charged in 500 cc. shake-flasks and was sterilized, respectively. To each medium, 0.2% of separately sterilized calcium carbonate was added. Into the medium thus prepared, *Bacillus fructosus* nov. sp. (ATCC 15451) was inoculated and was subjected to shaking culture at 30° C. After 3 days of the culture, the amount of frustose produced reached 85% based on sorbitol.

The cultured medium was filtered to remove the calcium carbonate and cells and was adjusted to pH 7.0. One liter of the filtrate was collected and concentrated under reduced pressure to a volume of 200 cc. The concentrated broth was cooled to below 5° C. To the cooled liquid, there was added while stirring 150 cc. of 20% calcium oxide milk also cooled to below 5° C., whereby a white slurry-like calcium fructate was formed. The calcium fructate was suction-filtered and the resulting cake was washed with water cooled to below 5° C. Subsequently, the calcium fructate was suspended in 200 cc. of cooled water, and carbon dioxide was introduced into the suspension to adjust the pH to about 7.0, whereby calcium carbonate was precipitated. The precipitate was removed by filtration to obtain a free fructose solution.

The solution was adjusted to pH 4.5 with hydrochloric acid, and was subjected to decolorization treatment by addition of active carbon and further to ion-exchange resin treatment to remove inorganic substances. The resulting colorless transparent liquid had a fructose content of 9.2% and a volume of about 400 cc. The liquid was concentrated under reduced pressure and about 21 g. of fructose crystal was obtained.

*Example 4*

The same strain as in Example 3 was subjected to shaking culture in the same manners as in Example 3, using a medium at pH 7.0 comprising 5% sorbitol, 0.1% ammonium acetate or ammonium chloride, 0.1% potassium phosphate, 0.05% magnesium sulfate and 0.1% $CaCO_3$. After about 48 hours of the culture, when the fermentation yield became 42%, the culture was discontinued. The cultured medium was collected, filtered, subjected to active carbon treatment and to ion-exchange resin treatment, and then concentrated to obtain a colorless transparent viscous solution having a sorbitol concentration of about 30% and exhibiting a taste of fine flavor.

*Example 5*

750 g. of sorbitol, 30 g. of casate, 5 g. of $KH_2PO_4$, 2.5 g. of $MgSO_4 \cdot 7H_2O$ and 0.05 g. of $MnSO_4 \cdot 4H_2O$ were dissolved in distilled water to form a 5 liter solution, which was then sterilized at 120° C. for 10 minutes. Into a 10 l. jar fermenter, the sterilized medium thus prepared was charged together with 50 g. of dried and sterilized $CaCO_3$ and 200 cc. of inoculum which had been obtained by subjecting *Bacillus fructosus* nov. sp. (ATCC 15451) to shaking culture for 6 hours in a seed culture medium comprising 2% sorbitol, 0.5% C.S.L. and 1% $CaCO_3$. The culture of the microorganism was carried out under aerobic conditions at 30° C., with agitation (430 r.p.m.) and aeration (1 liter/min.).

After about 6 hours' culture, the production of fructose was initiated and, after 72 hours, the amount thereof reached 123 mg./ml. Thereafter, the production amount began to be reduced, therefore the culture was discontinued. The cultured medium was subjected to a clarifier to remove the cells and $CaCO_3$, and the resulting transparent liquid was concentrated under reduced pressure to a volume of about 2 liters. The concentrate was then treated successively with Centranol 291 (decolorizing resin), Amberlite IR 120 (polystyrene sulfonic acid type strongly acidic cation exchange resin, available from Rohm & Haas Co., U.S.A.), Amberlite IRA–68 (polystyrene-tertiary polyamine type, weakly basic anion exchange resin available from Rohm & Haas Co., U.S.A.) and the mixture of Amberlite IR 120 and Amberlite IRA 411 (polystyrene-quaternary-ammonium type strongly basic anion exchange resin, available from Rohm & Haas Co., U.S.A.) to remove inorganic salts, organic acids protein and coloring substances. 3.3 liters of the treated solution including washing solution, containing 18.2% of fructose, was obtained. The liquid was further concentrated under reduced pressure to a volume of about 1 liter to be brought into a viscous syrupy state. The syrupy liquid was thoroughly mixed with methanol and 2 g. of seed crystals of fructose, and the mixture was kept in a cold place to deposit crystals. The crystals were separated by filtration and dried to attain a yield of 420 g.

The crystals were Selivanov reaction positive, and were subjected to paper chromatography by use of anisidine hydrochloride to form spots exhibiting a yellow color, which is peculiar to ketohexose (the color is brown in the case of aldose) and the $R_f$ thereof completely coincided with that of fructose. Further, when heated together with phenylhydrazine over a boiling water bath, the crystals formed an osazone in such a short time as about 6 minutes (sorbose forms no osazone even when heated for 15 minutes). The osazone had a melting point of 204°–205° C. and was identical with that from fructose. Even if the osazone was mixed with that from fructose, the resulting mixture was not lowered in melting point. In view of the above facts, it was confirmed that the crystals are fructose.

*Example 6*

750 g. of sorbitol, 30 g. of casate, 5 g. of $KH_2PO_4$, 2.5 g. of $MgSO_4 \cdot 7H_2O$, and 0.05 g. of $MnSO_4 \cdot 4H_2O$ were dissolved in distilled water to form a 5 liter solution, which was then sterilized at 120° C. for 10 minutes. Using the sterilized medium thus prepared, *Bacillus megaterium* No. 37–3B (ATCC 15450) was fermented in a jar fermenter in the same manner as in Example 5. After 92 hours' culture, the estimated value of fructose reached 118 mg./ml. The fermented medium was centrifuged to remove the cells, adjusted to pH 6.5 with hydrochloric acid and a precipitate formed was removed by filtration. The filtrate was concentrated and treated with ion-exchange resins to obtain about 3 liters of a transparent liquid having a fructose concentration of 19.3%. The liquid was further concentrated under reduced pressure to a volume of about 1 liter. The concentrated liquid was mixed with methanol and 2 g. of seed crystals of fructose and the mixture was kept in a cold place to deposit fructose crystals. Yield: 395 g.

What is claimed is:

1. A process for producing fructose by fermentation, which comprises inoculating and culturing a fructose-producing microorganism in a medium containing sorbitol as a carbon source, a nitrogen source and inorganic salts, thereby producing and accumulating fructose in the medium, and then separating the so-accumulated fructose, the said microorganism belonging to one of the genera Bacillus and Pseudomonas.

2. A process according to claim 1 wherein the fructose-producing microorganism employed is *Bacillus megaterium* (ATCC 15450).

3. A process according to claim 1 wherein the fructose-producing microorganism employed is *Bacillus fructosus* nov. sp. (ATCC 15451).

4. A process according to claim 1 wherein the fructose-producing microorganism employed is *Pseudomonas fluorescens* (ATCC 15453).

5. A process according to claim 1 wherein the fructose-producing microorganism employed is *Pseudomonas boreopolis* (ATCC 15452).

6. A process for preparing a fructose-containing sweetening composition by fermentation, which comprises inoculating and culturing fructose-producing microorganism in a medium containing sorbitol as a carbon source, an inorganic nitrogen source and inorganic salts, discontinuing the culture when the fructose produced amounts to about 20–50% based on the sorbitol, then filtering the culture medium, treating with a member selected from the group consisting of activated carbon and ion-exchange resin, and concentrating the resulting liquid to form a colorless transparent viscous fructose-containing liquid sweetening agent having a sorbitol concentration of about 30%, the said microorganism belonging to one of the genera Bacillus and Pseudomonas.

7. A process for producing fructose by fermentation, which comprises inoculating and culturing a fructose-producing microorganism in a sorbitol-containing medium which further contains, as nitrogen source, at least one member selected from the group consisting of L-glutamic acid, L-aspartic acid, L-arginine and L-proline and substances containing said amino acids, and also an effective amount of at least one salt of a metal selected from the group consisting of manganese, cobalt, copper and zinc, thereby producing and accumulating fructose in the medium and then recovering the fructose from the medium, said microorganism belonging to one of the genera Bacillus and Pseudomonas.

8. A process according to claim 7 wherein the amino acid containing substances are at least one member selected from the group consisting of hydrolysates of protein, extracts of plants, and extracts of microbial cells.

9. A process according to claim 7 wherein the nitrogen source is corn steep liquor.

10. A process according to claim 7 wherein said salt is manganese salt.

11. A process according to claim 10 wherein the amino acid containing substances are at least one member selected from the group consisting of hydrolysates of protein, extracts of plants, and extracts of microbial cells.

12. A process according to claim 7 wherein said salt is cobalt salt.

13. A process according to claim 12 wherein the amino acid containing substances are at least one member selected from the group consisting of hydrolysates of protein, extracts of plants, and extracts of microbial cells.

14. A process according to claim 7 wherein said salt is copper salt.

15. A process according to claim 14 wherein the amino acid containing substances are at least one member selected from the group consisting of hydrolysates of protein, extracts of plants, and extracts of microbial cells.

16. A process according to claim 7 wherein said salt is zinc salt.

17. A process according to claim 16 wherein the amino acid containing substances are at least one member selected from the group consisting of hydrolysates of protein, extracts of plants, and extracts of microbial cells.

References Cited by the Examiner

UNITED STATES PATENTS 2,311,235  2/1943  Kuderman _____ 99—141
2,753,279  7/1956  Cushing et al. _____ 195—31 X

OTHER REFERENCES

Childs: The Manufacturing Confectioner, pages 26 and 28, October 1945.

Cummins et al.: Journal of Biological Chemistry, vol. 224, pages 323 to 329, 1957.

A. LOUIS MONACELL, *Primary Examiner.*

ALVIN E. TANENHOLTZ, *Examiner.*